(12) United States Patent
Owen et al.

(10) Patent No.: US 7,611,307 B2
(45) Date of Patent: *Nov. 3, 2009

(54) APPARATUS FOR CONTROLLING UNDERWATER BASED EQUIPMENT

(75) Inventors: Alan Owen, Ellon (GB); Ian Gordon Bryden, Ellon (GB)

(73) Assignee: Robert Gordon University, Aberdeen (GB)

( * ) Notice: Subject to any disclaimer, the term of this patent is extended or adjusted under 35 U.S.C. 154(b) by 0 days.

This patent is subject to a terminal disclaimer.

(21) Appl. No.: 11/789,401

(22) Filed: Apr. 23, 2007

(65) Prior Publication Data

US 2008/0053358 A1  Mar. 6, 2008

Related U.S. Application Data

(63) Continuation of application No. 10/526,264, filed as application No. PCT/GB03/03845 on Sep. 5, 2003, now Pat. No. 7,275,891.

(30) Foreign Application Priority Data

Sep. 5, 2002 (GB) ................. 0220626.6

(51) Int. Cl.
*E02B 9/08* (2006.01)
(52) U.S. Cl. .................. 405/75; 405/224; 405/76
(58) Field of Classification Search ............. 405/75–78, 405/172, 224
See application file for complete search history.

(56) References Cited

U.S. PATENT DOCUMENTS

| 3,785,159 | A | * | 1/1974 | Hammond | .............. 405/77 |
| 3,978,345 | A | | 8/1976 | Bailey | |
| 4,086,775 | A | | 5/1978 | Peterson, Jr. | |
| 5,076,170 | A | * | 12/1991 | Seiple | .............. 102/411 |
| 6,531,788 | B2 | * | 3/2003 | Robson | .............. 290/43 |
| 6,568,878 | B2 | | 5/2003 | Woodall et al. | |
| 7,275,891 | B2 | * | 10/2007 | Owen et al. | .............. 405/75 |
| 2002/0158472 | A1 | * | 10/2002 | Robson | .............. 290/43 |
| 2003/0072615 | A1 | | 4/2003 | Woodall et al. | |
| 2005/0201832 | A1 | * | 9/2005 | Edfeldt | .............. 405/159 |

FOREIGN PATENT DOCUMENTS

DE    199 58 409    6/2001

* cited by examiner

*Primary Examiner*—Frederick L Lagman
(74) *Attorney, Agent, or Firm*—Drinker, Biddle & Reath, LLP (57) ABSTRACT

The apparatus may include a space frame on which is mounted at least one hydrofoil for generating positive or negative lift. The frame is attachable to underwater equipment such as a turbine. The hydrofoils are adapted to produce negative lift when a flow of liquid passes over them and so in use cause the apparatus and attached equipment to sink to the seabed. The flow of water over the hydrofoils continue to produce negative life and so maintain the apparatus on the seabed. In certain embodiments, the hydrofoils can typically be set to a passive configuration in which they flip over when the current flow changes direction. Furthermore, the hydrofoils are selectively rotatable to provide an angle of attack such that they may be adapted to provide positive lift when it is necessary to remove the apparatus from the water.

22 Claims, 8 Drawing Sheets

APPARATUS FOR CONTROLLING UNDERWATER BASED EQUIPMENT

RELATED APPLICATIONS

This application is a continuation of U.S. patent application Ser. No. 10/526,264, filed Jan. 20, 2006, now U.S. Pat. No. 7,275,891 which is the national phase of PCT Application No. PCT/GB2003/003845, filed Sep. 5, 2003 and which claims priority from UK Application Serial No. 0220626.6, filed Sep. 5, 2002. Priority is hereby claimed to each of the above applications, and those applications are incorporated herein by reference in their entirety.

TECHNICAL FIELD

The invention relates to an underwater location device such as may be used for controlling the launch, positioning or recovery of a tidal turbine or other underwater equipment. It should be noted that the example of a tidal turbine is used herein but the invention is not limited to such uses.

BACKGROUND ART

Tidal currents offer a considerable source of sustainable energy at various sites throughout the world, usually within easy reach of land and in relatively shallow waters. Tidal currents are created by movement of the tides around the earth producing a varying sea level, dependent on the phases of the moon and sun. As the sea levels vary, so the waters attempt to maintain equilibrium subject to gravitational forces, thus inducing flow from one area of sea to another. This flow is modified by a number of factors such as, the Coriolis forces due to the earth rotation, earth/moon/sun alignment, local topography, atmospheric pressure and temperature and salinity gradients. The major advantage of tidal power generation is its regularity, which can be predicted for years in advance.

According to a study by the ETSU (Energy Technology Support Unit) the United Kingdom may obtain up to 20 percent of its total electricity by using these systems to collect energy from fast moving tidal currents that exist in channels and offshore areas. Similar resources have been noted to exist elsewhere such as in the Straits of Messina, between Sicily and mainland Italy.

The most powerful flows tend to occur in areas of restriction, either by width or depth, but for the same reasons are not suitable for widespread exploitation by large, fixed devices which require a minimum rotor area, and therefore water depth, to justify the costs of installation and maintenance. It is assumed from the outset that new tidal barrage systems are unlikely ever to be pursued due to their inherent properties of high cost, delayed financial return, and serious environmental consequences.

The considerable size of the available resource has attracted various proposals for its exploitation.

The following represents the existing systems within the field of tidal current energy extraction. It is assumed that power transmission problems will be equal for any system, and that all systems will require some form of non-toxic anti-fouling agent.

There also exist operational environmental impacts common to all methods of tidal power generation, such as, an inherent risk of collision damage to fish and marine mammals, redirection of currents and the sediments and food particles contained within them, and shipping, particularly fishing.

A first type of tidal current energy extraction system encountered on the market is the Monopile system. This technology is well known and understood by contractors familiar with the offshore oil industry. It consists of twin axial flow turbines, each turbine driving a generator via a gearbox, mounted on streamlined cantilevers either side of a circular section, vertical steel monopile. It is anticipated that a number of structures will be grouped together in 'farms.' The planning of such a tidal 'farm' would need to be accurately modelled for wake effects, as once installed, the monopile is expensive to re-site. In addition, operational depth is restricted to the 20 m-35 m range. Concerning the installation and maintenance, monopile systems require a hole to be drilled in suitable bedrock and the base of the turbine tower is secured within the socket so produced. Existing monopile support mechanisms for presenting a tidal turbine to the tidal currents are expensive, thus making only a few sites economically viable for power generation and requiring considerable sub sea engineering expertise.

The current monopile systems permit raising the turbines above water level for maintenance and repair, which is beneficial, but the long-term (i.e. 20 years) reliability and corrosion resistance of the necessary mechanism must be questionable. The protrusion of the piles above sea level would reduce the likelihood of impact with passing vessels.

Concerning the environmental and decommissioning issues, the impact of installation would be considerable, especially to the benthic flora and fauna, but subsequently the piles may become areas of shelter and therefore, populated. To minimize the danger to shipping and fishing, decommissioning would require complete removal of the piles, which would disturb the benthic population once again.

A second type of tidal current energy extraction system that exists in the prior art is the floating tether. This floating tether device is anchored to the seabed with a mooring cable and suspended clear of the seabed using a flotation buoy. The axial flow tidal current turbine is free to position itself into the direction of the tidal flow, which obviates the need for a yaw mechanism.

Several prototypes have already been developed including a 10-kilowatt device tested in Scotland in 1994. At present, the arrangement is unlikely to be suitable for large power output installations due to the relative sizes of anchor, turbine and float. On occasions of relatively high velocity tidal streams (e.g. spring tides), if the anchor holds, the turbine will be dragged lower in the water with the unwanted potential to collide with the seabed.

Concerning the installation of the floating tether system, it is relatively quick and inexpensive. However, visual inspection would need to be frequent as the structure is likely to be subject to storm damage and fatigue loading of the cable, leading to possible loss of the supporting float and subsequent sinking of the device, or loss of anchorage and subsequent drifting. Once sunk, the device would be open to damage by the oscillating tidal currents and could prove difficult to recover, whilst a drifting device would potentially cause damage to any other moored turbines in its path.

Due to the length of tether required and the random positioning of the device at any one time, this arrangement is not suitable for closely grouped tidal farms and a safe spread would fail to make economical use of the power available in a given area. For the same reasons, this type of arrangement would present a hazard to all forms of shipping, large and small. It would, however present a possible solution to a one-off, small scale installation in areas such as the mouth of a sea loch. Concerning the environmental impacts of installation and decommissioning of the floating tether systems, it will be minimal, leaving no footprint on removal.

A third type of tidal current energy extraction system that also exists in the prior art is the oscillating hydroplane system. In that system, a central post mounted on five legs supports a complex mechanism comprising two interconnected symmetrical hydrofoils. These hydrofoils are used to pump high-pressure oil, which drives an electrical generator via a hydraulic motor. At the end of each stroke, the hydrofoils are tilted to give the required angle of attack to produce the return stroke, thus creating an oscillating motion.

Concerning the installation and maintenance, at present, the oscillating hydroplane system does not yet possess a launch and recovery mechanism. As a result of the constant oscillations and considerable number of moving parts, it is probable that this device will be subject to high dynamic loading and subsequent fatigue stress. The upward stroke of the hydrofoils will tend to lift the device off the seabed and hence increase the possibility of it being washed away at high tidal stream velocities.

Concerning the environmental impacts of installation and decommissioning of the oscillating hydroplane systems, they are expected to be minimal, leaving no footprint on removal. However, this cannot be confirmed until a launch/recovery mechanism is proposed. Using high pressure oil as a means of power transmission does however introduce the possibility of pollution in the event of leakage.

Some 'tidal' energy extraction systems can also be used in freshwater applications such as rivers.

With these existing systems and designs, it is a problem that their instabilities during operations as well as during launch and recovery, if possible, might cause damage. In addition, since these systems are becoming larger and larger, the frequent installation and maintenance operations will become more and more difficult and expensive.

SUMMARY OF THE INVENTION

It is an object of the present invention to obviate or mitigate the problems of controlling underwater equipment in a flow-stream.

In a first aspect, the invention described herein relates to an apparatus for controlling underwater equipment comprising: attachment means for attaching underwater equipment to the apparatus; and at least one member for generating positive or negative lift.

Preferably, the at least one member is adapted to create a negative lift due to fluid flow in a first direction and is adapted to create a negative lift due to fluid flow in a second, different, direction.

Preferably, the first and second directions are generally opposite to each other.

Preferably, the apparatus is adapted to anchor the underwater equipment to a sea- or river-bed.

Preferably, the attachment means is adapted to attach the underwater equipment in close proximity to the centre of gravity of the apparatus.

Preferably, the space frame is mounted on a number of feet equipped with slippage prevention means, which may be an arrangement of spikes or the like, to typically resist slipping by shear force rather than relying on friction alone such that, in use, the negative lift will preferably tend to force said slippage prevention means into a sea- or river-bed thus resisting the drag forces acting on the space frame tangentially to the seabed.

Preferably, the at least one member comprises at least one hydrofoil.

Typically, differences in pressure acting on opposing surfaces of each of the at least one member due to a predetermined angle of attack causes said at least one member to generate negative or positive lift.

Preferably, the apparatus is adapted to control the launch and/or recovery of the underwater equipment attached to it.

In a preferred embodiment, the at least one members are rotatable to any position and even more preferably in the region of 160° to 200° about a longitudinal axis of the respective member.

Preferably, the hydrofoils are symmetrical.

Said at least one members preferably comprise at least one hydrofoils which are more preferably self-rectifying static hydrofoils, which may be capable of passive rotation about an axis such that each hydrofoil maintains alignment with a periodically reciprocating rectilinear flow.

Moreover, the at least one members are preferably moveable between a first configuration in which they are capable of generating positive lift and a second configuration in which they are capable of generating negative lift.

Preferably, the at least one member has a variable actuating means to vary the positive or negative lift generated by the member.

Preferably, said actuating means comprises a motor which may be a hydraulic, pneumatic or electric actuated motor. Preferably, a shaft member is actuated when a change between first and second configurations is required, said actuation typically causing the shaft member to rotate through a predetermined angle, which may be in the region of 180°.

Preferably, said apparatus comprises a support framework which is typically composed of sub frameworks, where a number of shaft members are connected to the framework and on which said symmetrical hydrofoils are coupled. Preferably, the at least one hydrofoils are coupled to the support framework by a respective bearing member connected to the hydrofoil. The bearing member of the hydrofoil is typically coupled to the shaft member of the framework, the bearing member and shaft member combining to provide a rotation enabling portion and a rotation prevention portion. Preferably, the bearing member is substantially cylindrical. The rotation prevention portion typically comprises at least one stop members (which may be in the form of lugs mounted on the shaft member) and which are adapted to engage with at least one respective stop members (which may also be lugs) mounted on the respective bearing member of each hydrofoil. Typically, the bearing member comprises a pair of stop members which are spaced apart around its inner circumference, typically being spaced apart by approximately 180°.

Typically, the shaft member comprises a pair of stop members which are spaced apart around its outer circumference, typically being spaced apart by approximately 180°. Preferably, one of the bearing stop members is engageable with a respective shaft stop member to define the first negative configuration and the other of the bearing stop members is engageable with the other of the shaft stop members to define the second negative configuration.

Preferably, said apparatus is a multi-legged, self-leveling space frame equipped with a plurality of hydrofoils, typically at different heights.

In alternative embodiments, the at least one member is rigidly connected to a support framework and is unsymmetrical. Preferably, the at least one member comprises a disc shaped member which, in use, is adapted to produce positive or negative lift regardless of the direction of flow of fluid thereby. Preferably, the disc shaped member produces negative lift.

According to a second aspect of the invention, there is provided a method of controlling underwater equipment; the method comprising: providing an apparatus having at least one member for generating positive or negative lift; attaching the apparatus to underwater equipment; releasing the apparatus into a fluid; allowing fluid to flow past the at least one member to generate positive or negative lift.

Preferably, the method according to the second aspect of the invention is performed using the apparatus according to the first aspect of the invention.

Preferably, the apparatus is placed in a flow of water.

Preferably, the underwater equipment is a turbine.

According to a further aspect of the present invention, there is provided an apparatus for maintaining underwater equipment within a sea or river tidal current location, the apparatus comprising at least one moveable members capable of generating negative lift, where said at least one members are moveable between a first configuration in which they create a negative lift due to flow in a first direction, and a second configuration in which they create a negative lift due to flow in a second, different, direction.

The invention also provides energy extracting apparatus for extracting energy from fluid flow, said energy extracting apparatus comprising: a turbine; at least one member, which in use, generates positive or negative lift.

BRIEF DESCRIPTION OF THE DRAWINGS

Embodiments of the present invention will now be described, by way of example only, with reference to the accompanying drawings, in which.

DETAILED DESCRIPTION OF THE INVENTION

According to the present invention, the apparatus for launching an underwater device from a vessel, securing the underwater device whilst in operation on the seabed and permitting recovery to a vessel, for maintenance and repair should be as simple as possible without involving any sophisticated and specialized equipment. A first embodiment of the invention is shown in FIG. 1 and utilizes passive, self-rectifying static hydrofoils, the central shaft (see FIG. 3) of which can be rotated through 180° to generate positive or negative lift as required.

Figure 1:
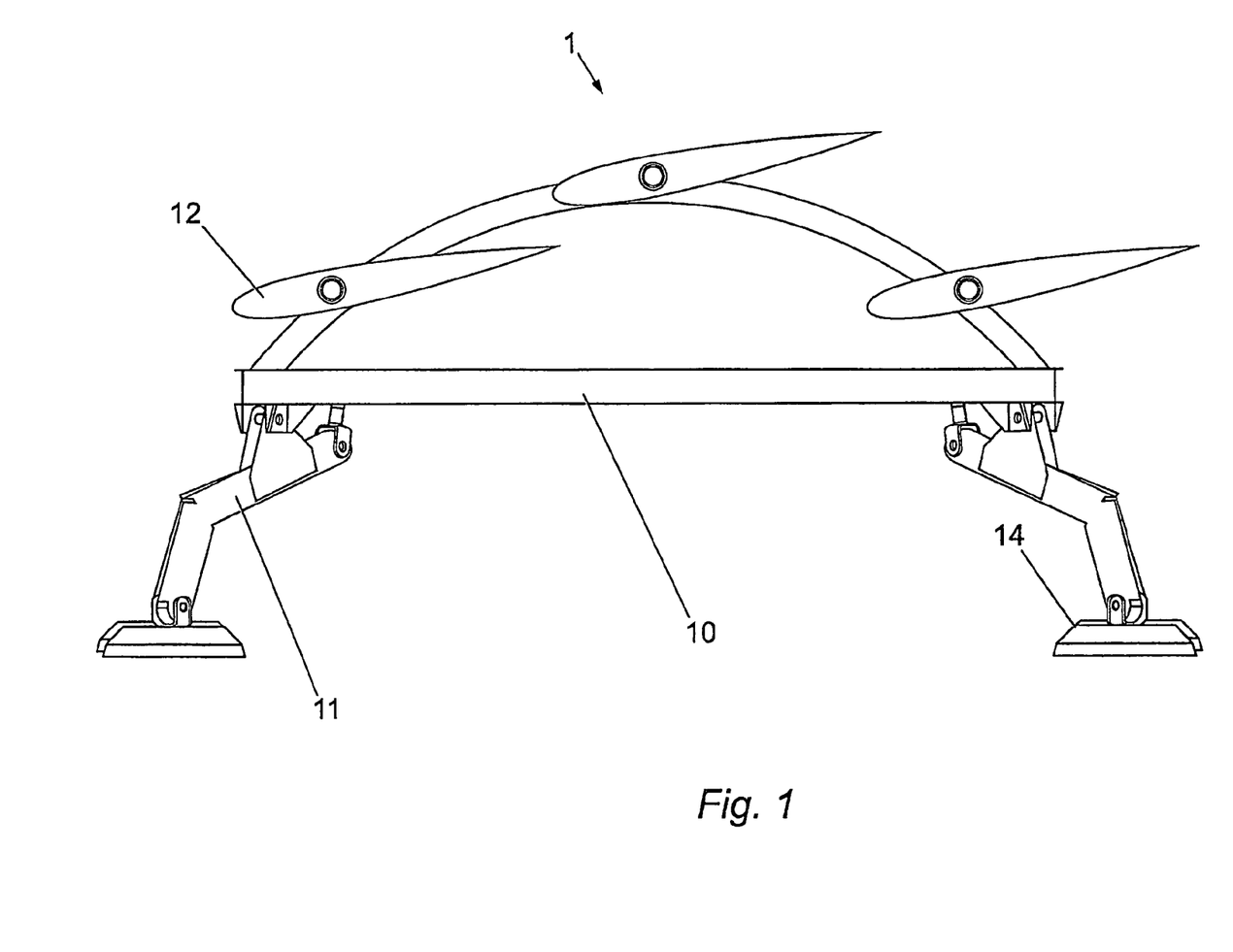
FIG. 1 shows a side view of a space frame in accordance with the present invention, showing a tubular frame allowing the positioning of the hydrofoils at differing heights.

As is shown in FIG. 1, the apparatus 1 for controlling the launch, secure positioning and recovery of an underwater device comprises a space frame 10 for attaching to any desired underwater device such as power extraction equipment which may comprise a tidal turbine (not shown), a hydrofoil support frame to accommodate the self rectifying hydrofoil mechanisms 12 and hydraulically operated legs 11 for leveling of the apparatus 1. The feet 14 are equipped with spikes or similar serrated attachments (not shown) to initiate grip on the sea or river bed.

The hydrofoils 12 are inclined in such a way as to generate a significant downforce as a result of the stream flow over their surfaces. This downforce will push the apparatus 1 into the seabed, and, since the actual applied force will be proportional to the square of the velocity of the fluid passing over them, the apparatus 1 will be more securely fixed as the streamflow velocity increases. By this means the apparatus can overcome overturning moments applied to the underwater device that it supports.

The space frame 10 is shown as arched tubing but is not restricted to shape since any frame configuration offering different levels of mounting point for the hydrofoils 12 will suffice. The apparatus 1 as shown has multiple hydrofoils 12 but any number of hydrofoils 12 will suffice. As is shown in FIGS. 2a to 2h, each hydrofoil 12 is mounted on a central shaft 48 such that it may rotate upwards from horizontal (or any angle of inclination above horizontal) through vertical to any angle above horizontal but now pointing in the opposite direction. The angle of attack of the hydrofoils 12 is governed by the relative size and positioning of lugs 46 attached to the central shaft 48 and the corresponding lobes 44 attached to an outer shaft (not shown) which is itself fixed to the hydrofoil 12.

In a preferred embodiment, the apparatus 1 according to the present invention comprises a multi-legged, self-leveling space frame 10 equipped with a number of hydrofoils 12 at different heights with any underwater device, such as a tidal turbine, it supports, situated as close as practicable to the centre of gravity of the apparatus 1.

It is anticipated that the space frame 10 will be mounted on a number of feet 14 equipped with spikes (not shown) to resist slipping of the apparatus 1 with respect to the river bed (not shown) by shear force rather than relying on friction alone. The number of feet 14A, 14B required will depend on the weight of the apparatus 1; however, the location and the shape of these supporting feet 14A, 14B aim at holding the apparatus 1 in the orientation shown in FIG. 1 upwards against the current and thus ensuring the stability of the space frame 10. The negative lift (arrow A) will tend to force these spikes into the sea or river bed (not shown in FIG. 1) thus resisting the drag forces acting on the space frame 10 tangentially to the sea or river bed.

The drag forces acting on the underwater device (such as the tidal turbine) attached to the apparatus 1 will naturally tend to apply an overturning moment to the space frame 10 about its rearmost feet 14B, with respect to the direction of flow (arrow F). These forces will however be overcome by positioning the hydrofoils 12 at stations such that the negative lift (arrow A), created by the foremost or upstream (those at the left hand side of the space frame 10 as shown in FIG. 1)

hydrofoils 12 acting over the length of the space frame 10, is arranged to exceed the overturning moment.

Thus, the space frame 10 is symmetrical about its midpoint M with the hydrofoils 12 being coupled to the space frame 10 in a manner, to be subsequently detailed in a discussion of FIGS. 2a to 2h, which allows them to passively reverse with stream flow F to maintain compressive forces in a downwards direction A and restraining moments regardless of tidal stream direction.

During operation of the apparatus 1, the hydrofoils 12 are free to rotate (shown as clockwise in FIGS. 2a to 2d and 2I to 2m) in response to the change in tidal stream flow F direction in a manner which is shown from left to right in FIGS. 2a to 2d to create a negative lift (arrow A) so as to push the apparatus 1 into the seabed.

Figures 2A, 2B:
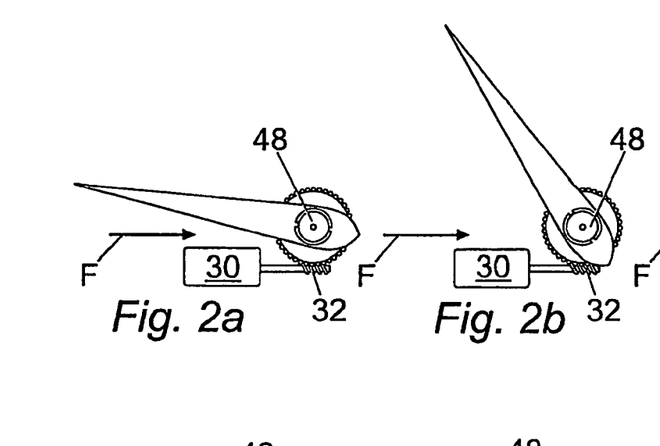
FIGS. 2a to 2d show the passive reversing of the hydrofoils in response to a change in flow direction whilst
Figures 2C, 2D, 2G, 2H:
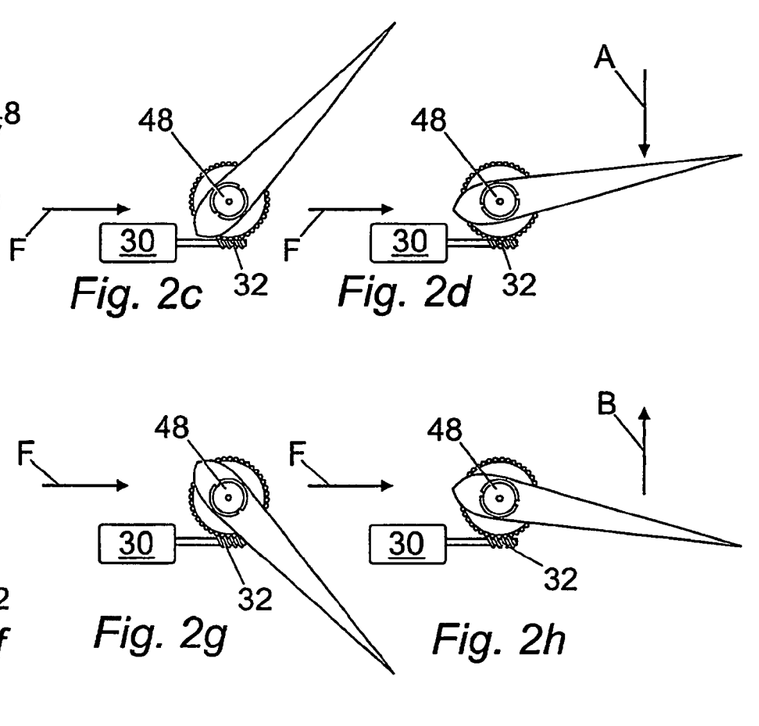
FIGS. 2e to 2h show the different movements of hydrofoils of FIG. 1 actuated by hydraulic motors to create positive and negative lifts during launch, recovery and transitional operations according to the present invention.
Figures 2E, 2F:
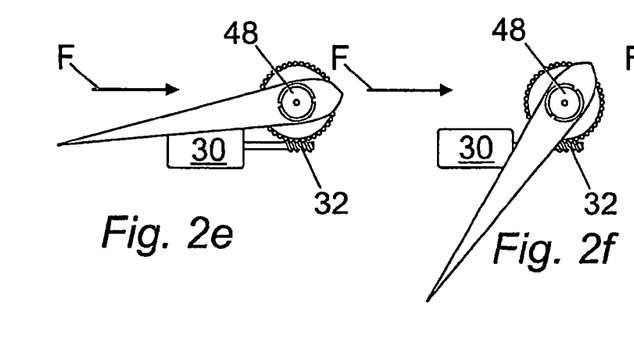
Figures 2I, 2J, 2K, 2M:
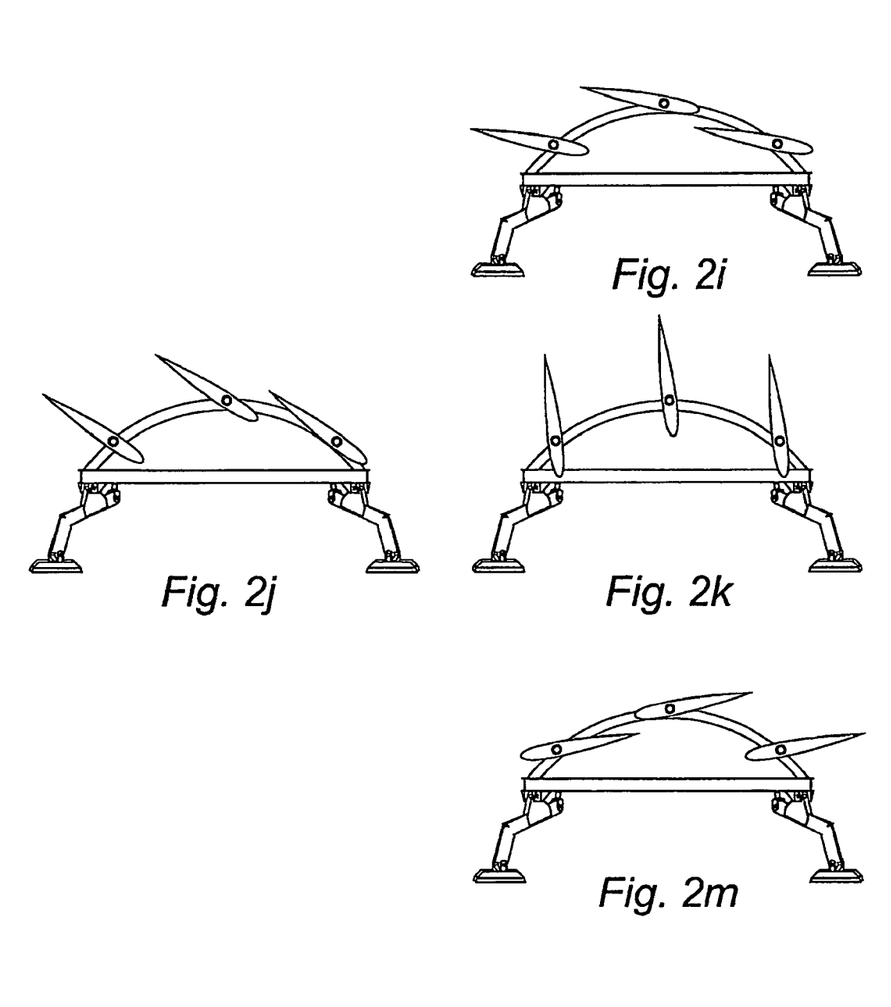
FIGS. 2i to 2m show the passive reversing of the hydrofoils in response to a change in flow direction.
Figure 2L:
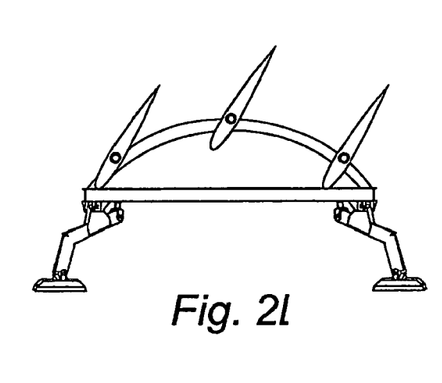
Figure 3:
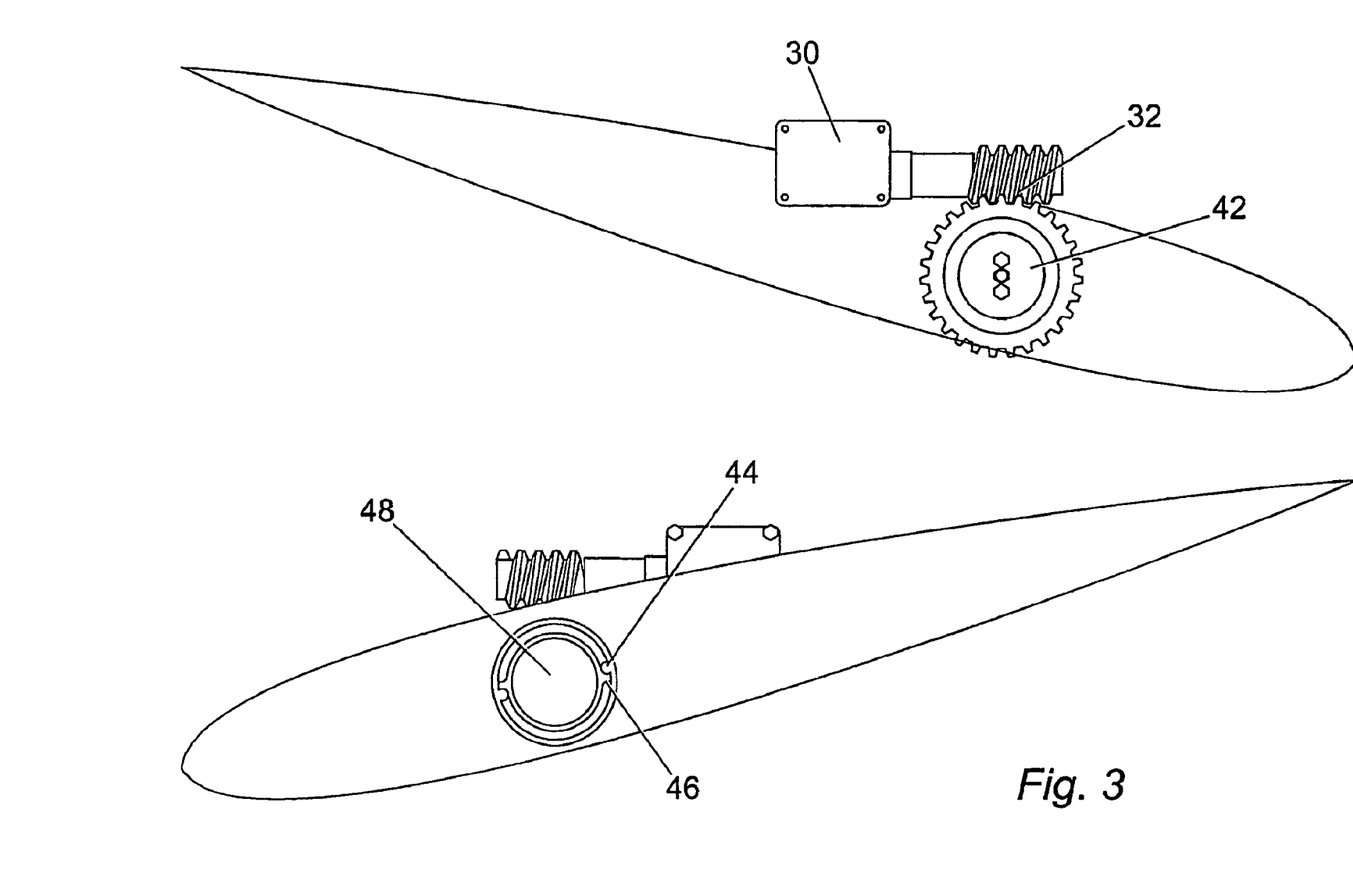
FIG. 3 in its upper half shows a first side view, and in its lower half shows an opposite side view, illustrating the fundamental geometry of the passive reversing mechanism.

When the apparatus 1 is to be installed on the seabed or is to be recovered from the seabed for e.g. maintenance of the apparatus 1, as shown in the FIGS. 2a to 2d, hydraulic motors 30, via a suitable gearing mechanism such as a worm and wheel arrangement 32 (as shown in FIG. 3) or chain type mechanism (not shown), are utilized to rotate (shown as anti-clockwise in FIGS. 2e to 2h) the longitudinal axes (i.e. the horizontal axes perpendicular to the stream flow 12) of the hydrofoils 12 through the required angle until the hydrofoils 12 have reached the configuration shown FIG. 2h; for the configuration shown in FIGS. 2e to 2h, this angle is approximately 180°. It should be kept in mind that the hydraulic motors 30 can be replaced by pneumatic or electric motors. In other words, if the apparatus 1 is towed, e.g. by a boat or other vessel or installation at the surface, the hydrofoils 12 will produce positive lift (arrow B) as shown in FIGS. 2e to 2h. For launch and recovery, this positive lift can be utilized to raise or lower the space frame 10 within the tidal stream. If required, this action could be augmented by forming air tanks within the space frame 10 that can be 'blown' with compressed air to improve the buoyancy of the apparatus 1. If the hydraulic motors 30 use the worm and wheel mechanism 32 form of drive, the hydrofoil 12 positions can be altered over a range of positions, thus permitting the apparatus 1 to be 'flown' in the water. Hydraulic connections (and pneumatic connections if required) can be affixed to a supporting marker buoy (not shown) for ease of access.

FIG. 3 shows the mechanism and assemblage of hydrofoils 12, hydraulic motors 30 and worm and wheel drive shaft mechanisms 32 in more detail. The hydrofoils 12 are free to rotate about a central shaft 48, through an included angle of say 160° which will maintain an angle of 10° to the horizontal. The 10° angle effectively becomes an angle of attack when the tidal stream flow F reverses. Thus as the tidal stream 10 reciprocates, the hydrofoils 12 will maintain an angle of 10°, creating a negative lift (arrow A), which will therefore push the spikes 16 into the seabed and immobilize the space frame 10. As will be described subsequently, positioning lugs 46 mounted on a central shaft 48 provided a stop for locating lobes 44 of the hydrofoil 12, such that the hydrofoil 12 cannot rotate further than the 160° shown in FIGS. 2a to 2d.

By rotating the central shaft 48 through slightly greater than 180° (say 200°), the negative lift becomes positive lift (arrow B) and the space frame 10 will rise through the water so that the tidal turbine 90 can be recovered on the vessel (not shown).

Figure 4:
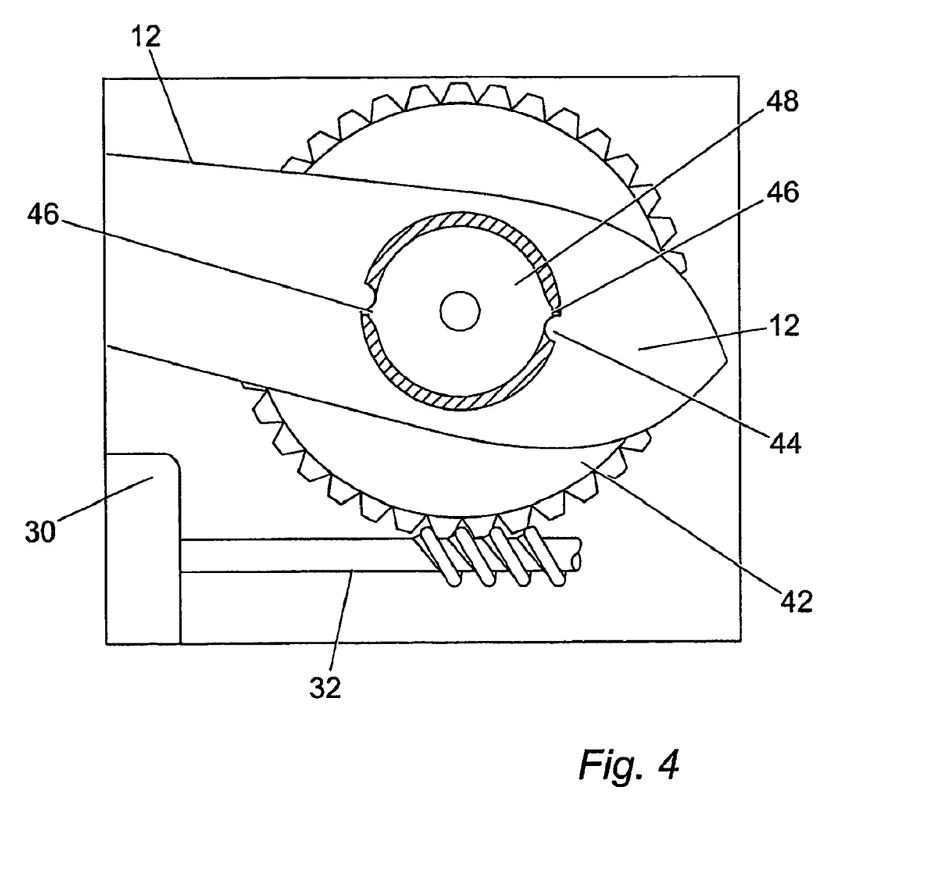
FIG. 4 shows in detail the assemblage of hydrofoils onto the space frame of FIG. 1.

FIG. 4 shows in more detail the mechanical assemblage of hydrofoils 12 with space frame 10. The hydraulic motor 30 for actuating the positioning gear is equipped with a drive shaft 32 that is utilized for rotating an indented positioning gear 42 or a toothed gear wheel. The positioning gear 42 is solidly attached to a central shaft 48 which passes through a bore provided in the larger end of each hydrofoil 12, a section of which is show on FIG. 4. The bore of the hydrofoil 12 is provided with a pair of diametrically opposed and inwardly projecting hydrofoil locating lobes 44. The central shaft 48 has a pair of diametrically opposed and outwardly projecting positioning lugs 46, each one of which selectively co-operates with one of the respective pair of diametrically opposed hydrofoil locating lobes 44.

Thus, by rotating the drive shaft 32, the hydraulic motor 30 actuates or rotates the position gear 42 which in turn rotates the central shaft 48. The positioning lugs 46 will contact the locating lobes 44 and carry them 44 (and the hydrofoil 12) about the rotational axis of the central shaft 48 until the hydrofoil 12 is in the desired configuration, this being through an angle of approximately 160° until the hydrofoil 12 is in the configuration shown in FIG. 2h. At this point, the motor 30 is de-actuated and the positioning lugs 46 will hold the hydrofoil 12 locked in this configuration. The rotation of 160° enables the hydrofoil 12 to maintain an angle of 10° to the horizontal in order to provide an angle of attack when the tidal stream F reverses.

Figure 3A:
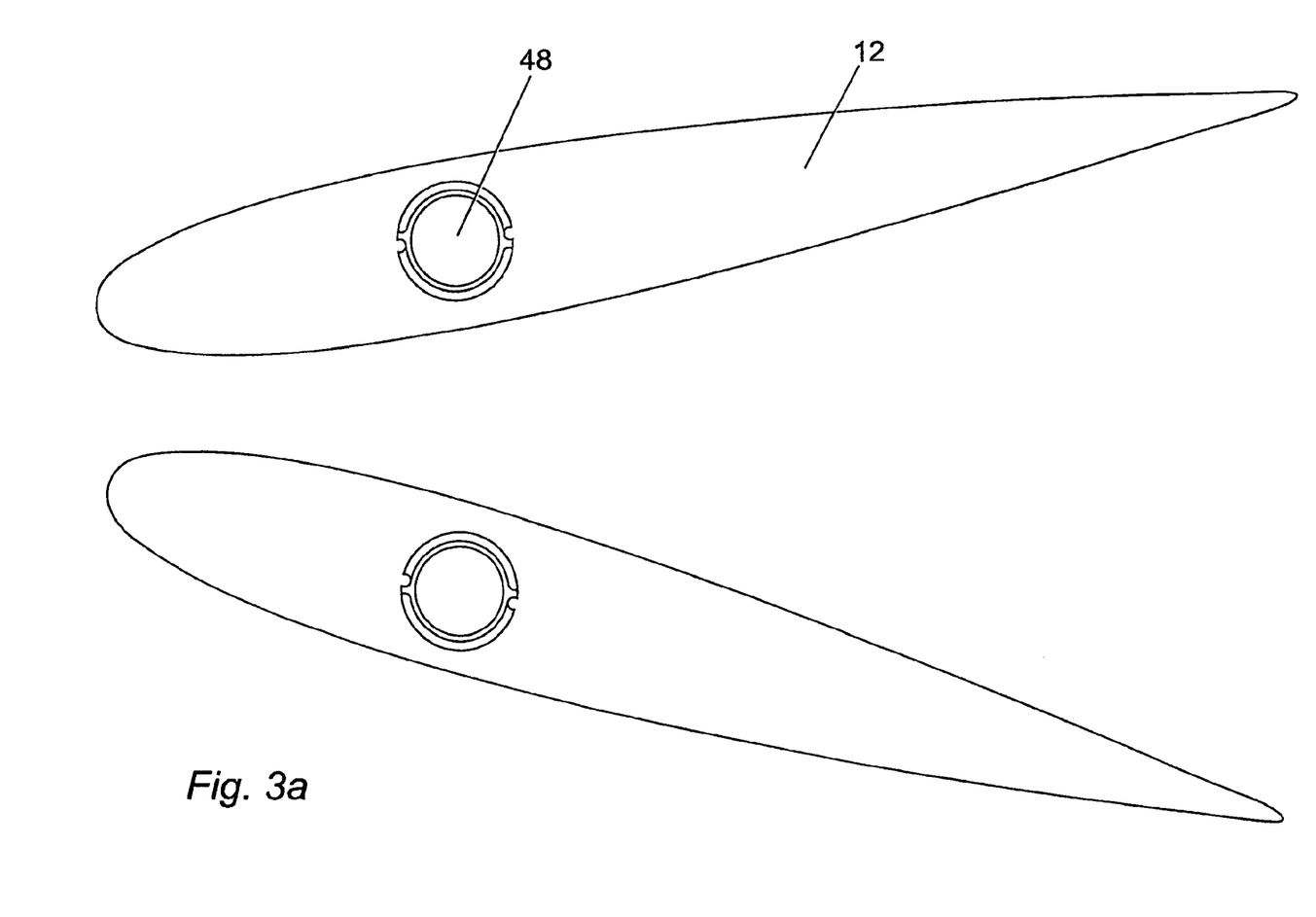
FIG. 3a in its upper half shows a first side view, and in its lower half shows an opposite side view, illustrating the fundamental geometry of the passive reversing mechanism.
Figure 3B:
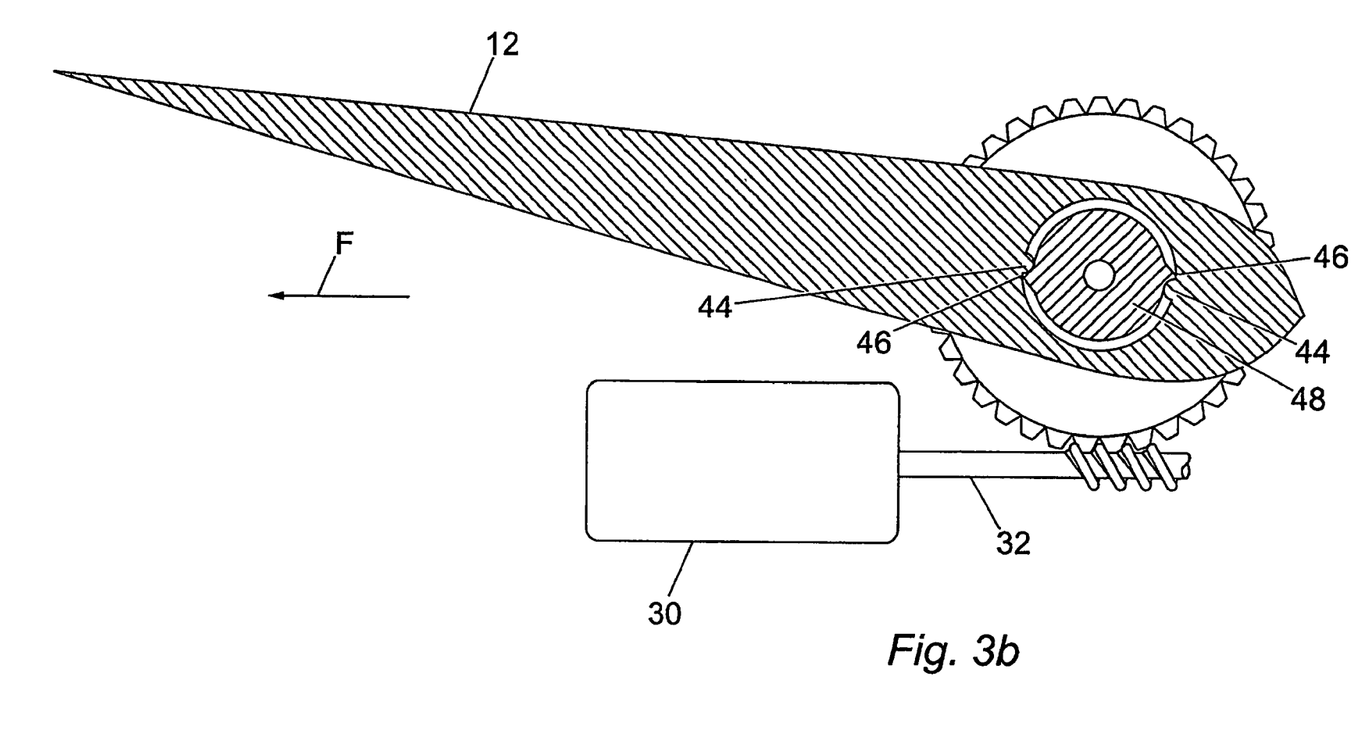
FIG. 3b is a third side view showing the fundamental geometry of the passive reversing mechanism.

Conversely, the rotation of the central shaft 48 by 180° drives the hydrofoils 12 to create a positive lift and in which case, the space frame 10 will rise through water. FIG. 3a shows how the attitude of the hydrofoil 12 is changed by a simple 180° clockwise rotation of the central shaft 48.

The apparatus according to the present invention, can be launched and recovered by a non-specialist vessel, using non-specialist equipment. Indeed if the vessel is large enough, a number of apparatus 1 may be launched or recovered in a day without the need to return to port. This will also permit easy access for maintenance and repair. Since apparatus 1 possesses few moving parts and no complex mechanisms, it should be inherently reliable.

A second embodiment of an apparatus in accordance with the present invention is shown in FIGS. 5a-5d. The apparatus 100 comprises a tripod support frame 110, a bottom ring or stand 126, a disc-shaped hydrofoil 112, support brackets 120 and an attachment ring 122 with bolts 123. The apparatus 100 is attached to an ADCP canister 124 via the attachment ring 122 and bolts 123. Other subsea equipment may also be attached to the apparatus 100 in place of the canister 124.

Figure 5A:
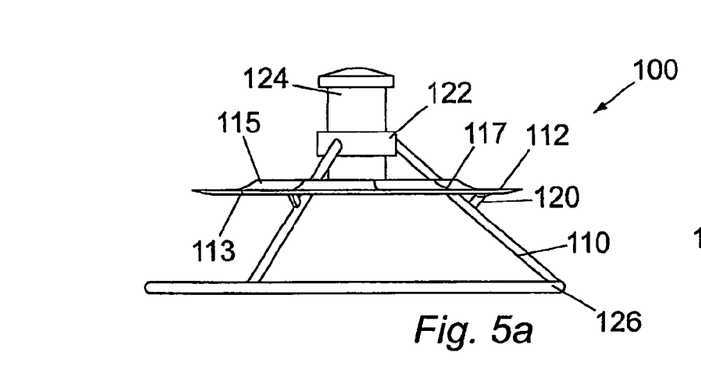
FIG. 5a is a side view of a second embodiment of an apparatus in accordance with the present invention and an attached canister.
Figure 5B:
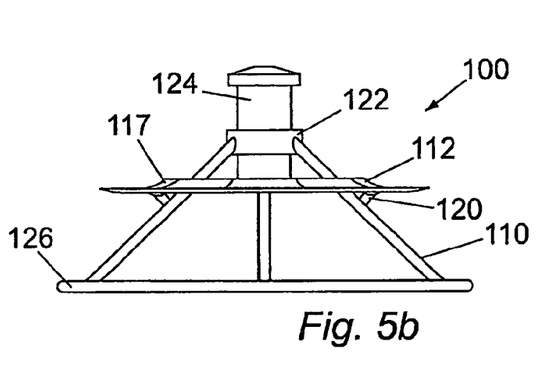
FIG. 5b is a front view of the FIG. 5a apparatus with the attached canister.
Figure 5C:
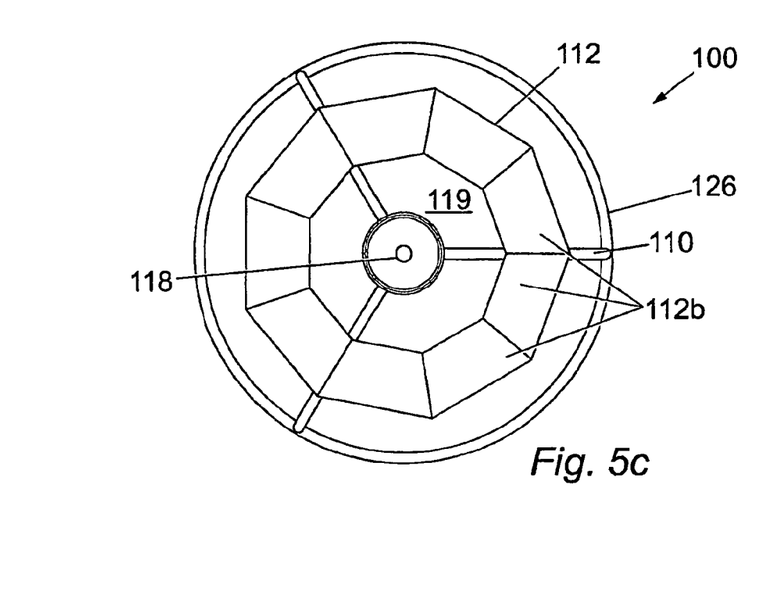
FIG. 5c is a plan view of the FIG. 5a apparatus with the attached canister; and, FIGS. 5d-5f are a series of views of an attachment ring which forms part of the FIG. 5a apparatus.
Figure 5D:
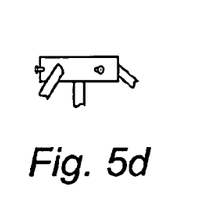
Figure 5E:
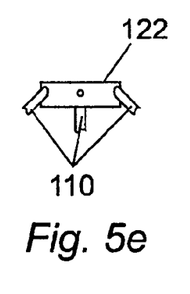
Figure 5F:
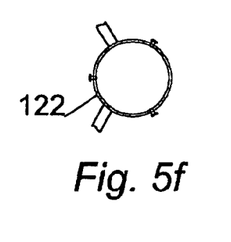

The hydrofoil 112 is rigidly connected to the frame 110 via the support brackets 120 and its plane is generally parallel to the main plane defined by the bottom ring 126 such that the hydrofoil 122 will be generally parallel to the seabed in use. A central aperture 119 is provided within the hydrofoil 112. A lower face 113 of the hydrofoil 112 faces the stand 126 and is of a generally flat surface, whereas its opposite, upper, face 115 faces away from the stand 126 and gradually curves upwards away from the main plane of the hydrofoil as it approaches the central aperture 119 to form a raised lip portion 117. This can be achieved by the assembly of a plurality of smaller hydrofoils 112s to produce a multi-faceted hydrofoil 112. The hydrofoil 112 thus has rotational symmetry around a central axis 118 but is not symmetrical on either side of its main plane.

Thus when a flow of water passes over each face 113, 115 of the hydrofoil 112, the reaction force of the water on the raised lip 117 pushes the hydrofoil 112 along with the other components of the apparatus 100 and ADCP canister 124 in a downwards direction—that is "negative lift" results.

Thus in use, the hydrofoil helps to direct the apparatus 100 and attached equipment towards the seabed and once in position, the hydrofoil maintains the apparatus and equipment on the seabed.

The apparatus 100 may be attached to a line (not shown) and the line attached at its other end to a buoy. If the apparatus needs to be recovered, the apparatus may be pulled in by the line.

An advantage of certain embodiments of the present invention, such as the second embodiment, is that they continue to perform their function of providing negative lift regardless of the direction of flow of the water.

An advantage of the second embodiment of the invention is that it includes no moving parts and so is reliable and requires minimal maintenance.

The embodiments described herein may also be provided with an integral turbine or other underwater equipment rather than attaching such equipment to the apparatus before use.

Although reference is made to employing the apparatus 1, 100 in a tidal current and in certain embodiments using a tidal turbine, it is to be understood that the apparatus 1, 100 may be placed in any flow of liquid such as rivers and are not limited to their use tidal areas.

An advantage of certain embodiments of the present invention is that they permit the launch and recovery of underwater equipment to be carried out using a non-specialist but suitably equipped vessel.

Concerning the primary environmental impact of embodiments of apparatus 1 according to the present invention, it would have some impact upon the benthic flora and fauna, and, although the positioning and retrieval of apparatus 1 would be relatively frequent (at least once every year is anticipated), nothing more than temporary localized disturbance is anticipated. There exists some potential for hydraulic oil leakage, but the system contents are minimal so, even in the event of complete system evacuation, any oil contamination would be minor. Operational environmental hazards are in common with the other forms of tidal energy extraction and decommissioning would leave no footprint.

Improvements and modifications in terms of dimensions and locations of the different parts described above may be incorporated to the hereinbefore described apparatus for controlling the launch and recovery of a tidal turbine without departing from the scope of the present invention.

The invention claimed is:

1. An underwater securing apparatus for maintaining the underwater securing apparatus and an underwater device in position on a seabed or riverbed whilst the underwater device is in operation, the underwater securing apparatus comprising:
    an attachment arrangement configured to attach an underwater device to the underwater securing apparatus; and
    at least one member for generating negative lift such that, in use, fluid flow past the at least one member provides a downforce to push the underwater securing apparatus toward the seabed or riverbed to thereby maintain the underwater securing apparatus in position on a seabed or riverbed.

2. Apparatus according to claim 1, wherein the at least one member is adapted to create a negative lift due to fluid flow in a first direction and is adapted to create a negative lift due to fluid flow in a second, different, direction.

3. Apparatus as claimed in claim 2, wherein the first and second directions are generally opposite to each other.

4. Apparatus as claimed in claim 1, wherein the at least one member is adapted to provide negative lift regardless of the direction of the flow of fluid thereby.

5. Apparatus as claimed in claim 1, wherein the at least one member comprises a main plane, which, in use, is generally parallel to the seabed or riverbed, and a central axis.

6. Apparatus as claimed in claim 5 wherein the at least one member has rotational symmetry around its central axis.

7. Apparatus as claimed in claim 5 wherein the at least one member comprises a central aperture through its main plane.

8. Apparatus as claimed in claim 1, wherein the at least one member comprises at least one hydrofoil.

9. Apparatus as claimed in claim 8 wherein the at least one member comprises a multifaceted hydrofoil consisting of an assembly of smaller hydrofoils.

10. Apparatus as claimed in claim 1 wherein the at least one member is disc-shaped.

11. Apparatus as claimed in claim 1 further comprising a support frame.

12. Apparatus as claimed in claim 11, wherein the at least one member is rigidly connected to the support frame.

13. Apparatus as claimed in claim 1 wherein the apparatus is mounted on a number of feet equipped with slippage prevention means.

14. Apparatus according to claim 1, wherein the at least one member is free to rotate through a pre-determined angle.

15. Apparatus according to claim 1, wherein the at least one member comprises at least one hydrofoil capable of passive rotation about an axis such that each hydrofoil maintains alignment with a periodically reciprocating rectilinear flow.

16. Apparatus as claimed in claim 1, wherein said at least one member is moveable between a first configuration in which it is capable of generating positive lift and a second configuration in which it is capable of generating negative lift.

17. Apparatus according to claim 1, wherein the at least one member has a variable actuating means to vary the positive or negative lift generated by the member.

18. An assembly comprising the underwater securing apparatus according to claim 1 and a turbine attached to the underwater securing apparatus, the turbine being adapted to, in use, extract energy from a fluid flowing past the assembly.

19. Apparatus according to claim 1, further comprising at least one ground engaging surface, which, in use, supports the underwater securing apparatus on the seabed or riverbed.

20. Apparatus according to claim 1, further comprising a rigid support assembly which is operative to bear the underwater device when the underwater securing apparatus is on the seabed or riverbed.

21. Apparatus as claimed in claim 1, wherein the attachment arrangement is adapted to attach the underwater device in close proximity to the center of gravity of the underwater securing apparatus.

22. A method of maintaining an underwater securing apparatus and an underwater device in position on a seabed or riverbed whilst the underwater device is in operation, the method comprising:
    attaching the underwater device to the underwater securing apparatus by an attachment arrangement, the underwater securing apparatus comprising at least one member for generating negative lift;
    disposing the underwater securing apparatus on a seabed or riverbed; and
    maintaining the underwater securing apparatus in position on the seabed or riverbed by operation of the at least one member providing a downforce to push the underwater securing apparatus toward the seabed or riverbed.

* * * * *